April 11, 1939.  G. D. WILLIAMS  2,153,785
ELECTRICAL WELDING MACHINE
Filed Oct. 19, 1936   5 Sheets-Sheet 2
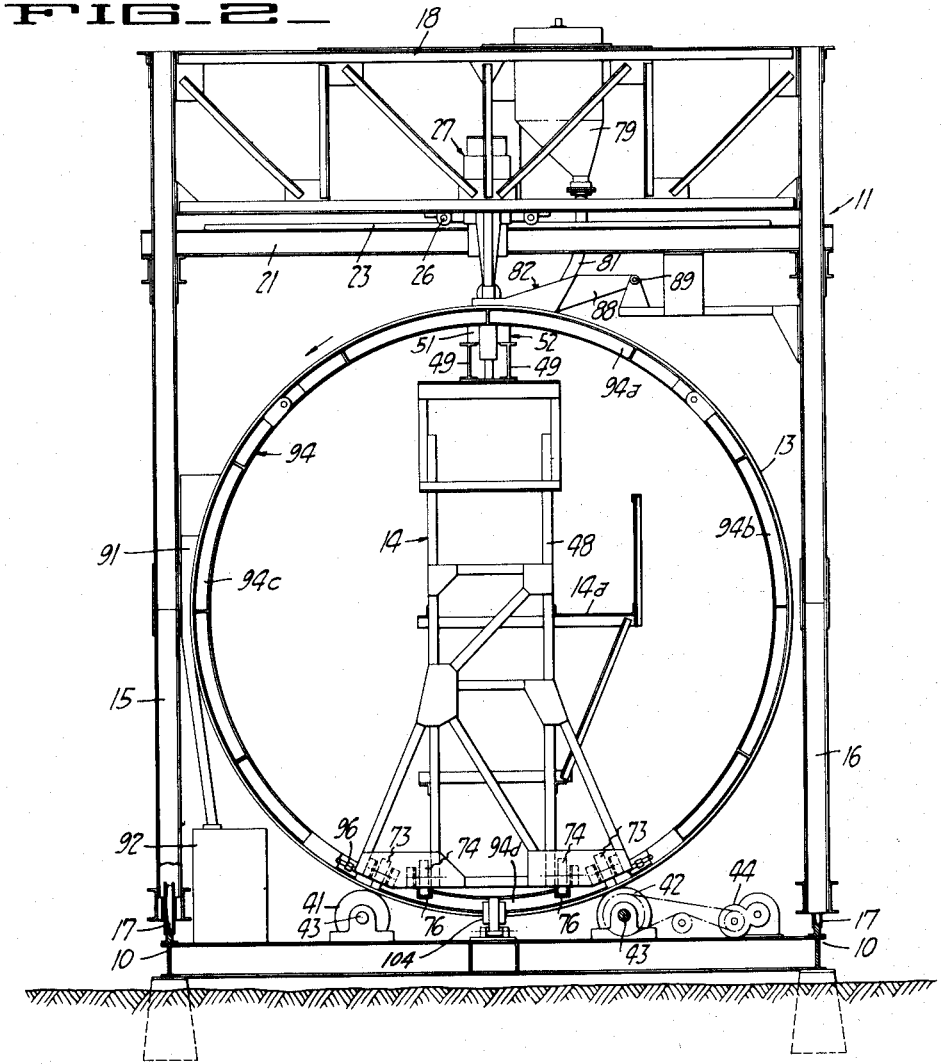
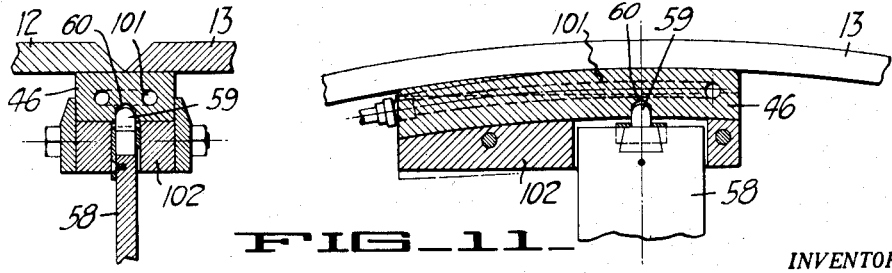
INVENTOR.
George D. Williams
BY Paul D. Flehr
ATTORNEY

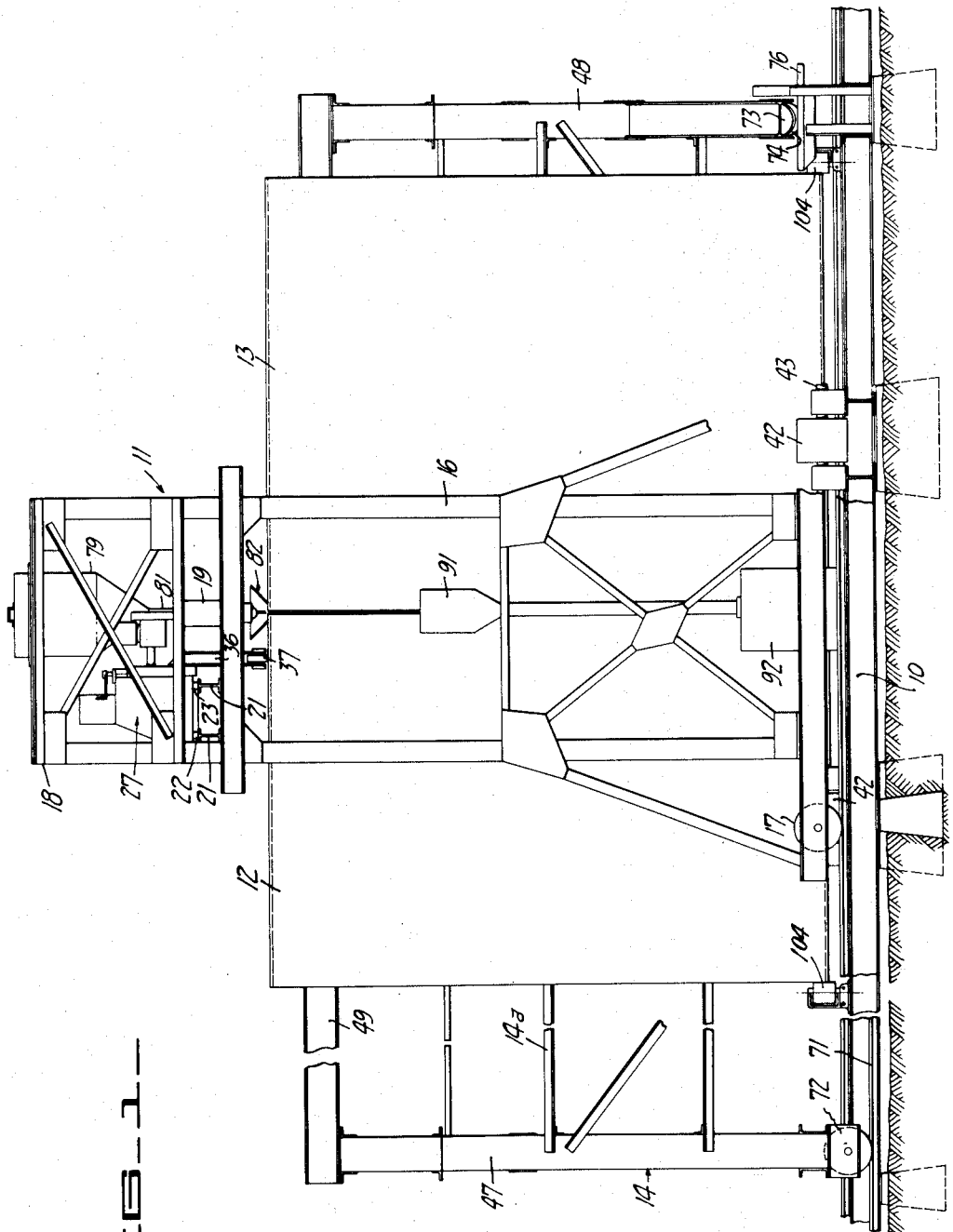

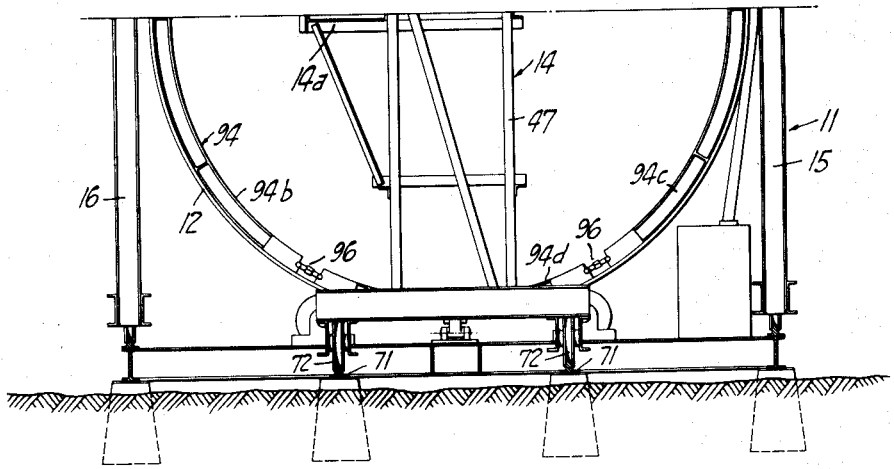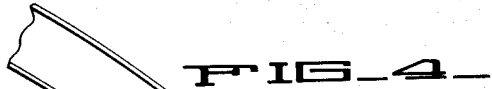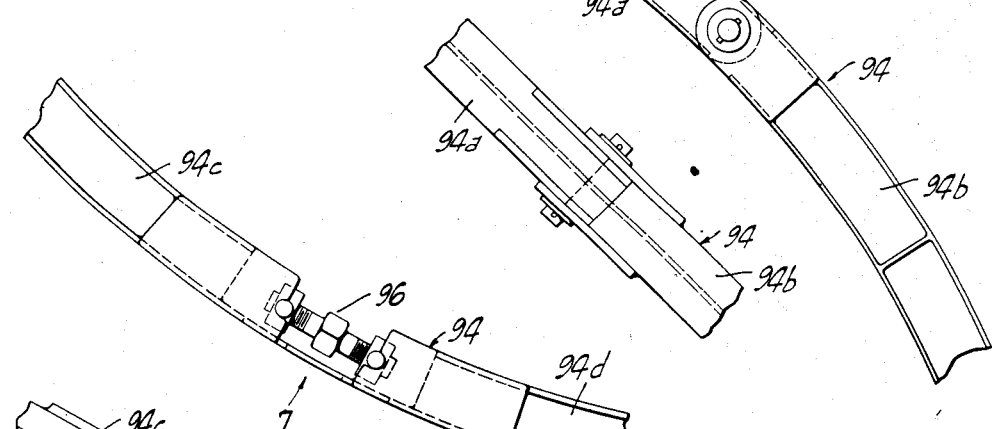

April 11, 1939. G. D. WILLIAMS 2,153,785
ELECTRICAL WELDING MACHINE
Filed Oct. 19, 1936 5 Sheets-Sheet 4
FIG_8_
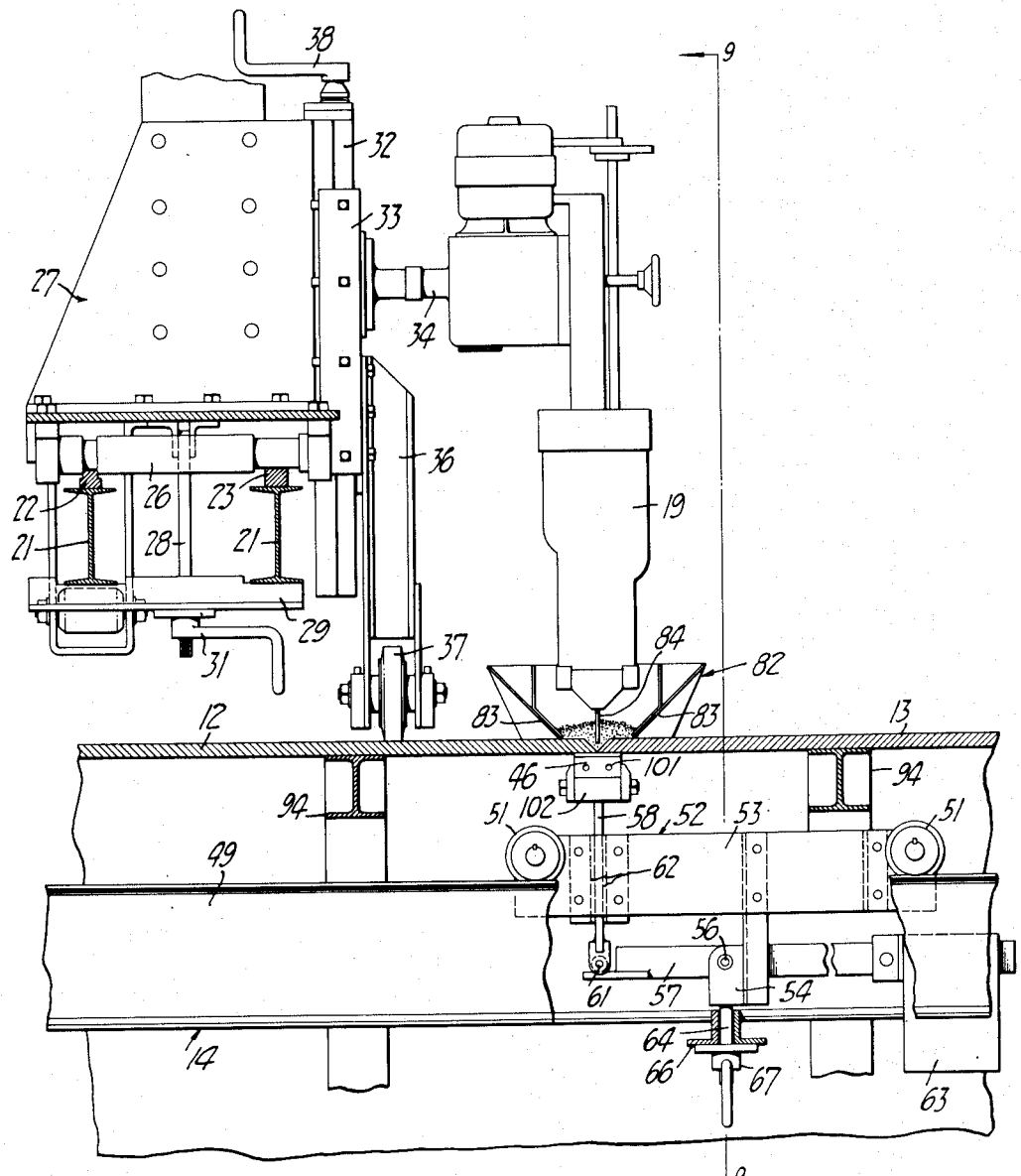
INVENTOR.
George D. Williams
BY Paul D. Flehr
ATTORNEY April 11, 1939. G. D. WILLIAMS 2,153,785
ELECTRICAL WELDING MACHINE
Filed Oct. 19, 1936 5 Sheets-Sheet 5
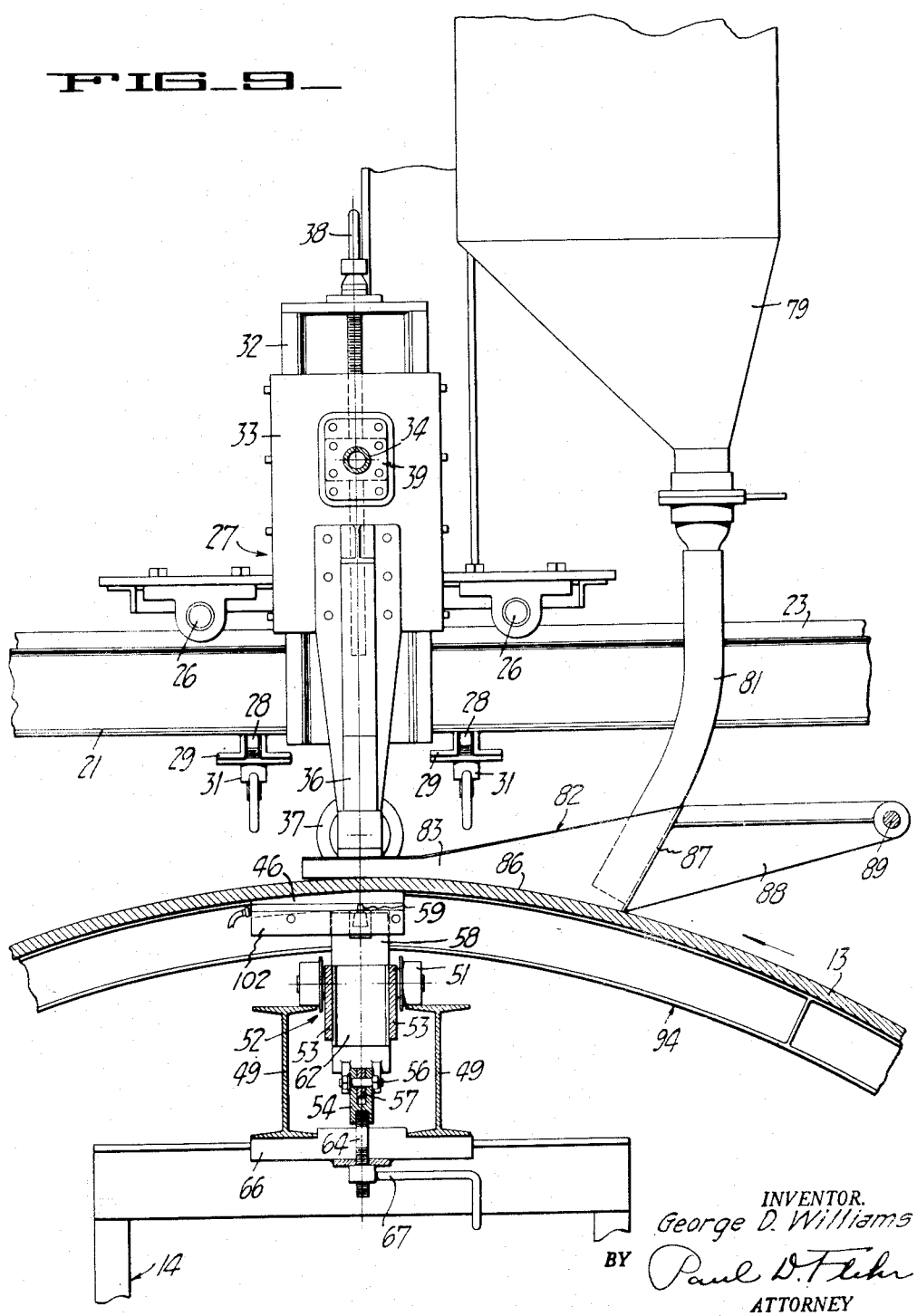
FIG_9_
INVENTOR.
George D. Williams
BY Paul D. Flehr
ATTORNEY Patented Apr. 11, 1939

2,153,785

UNITED STATES PATENT OFFICE 2,153,785

ELECTRICAL WELDING MACHINE

George D. Williams, South San Francisco, Calif., assignor to Western Pipe & Steel Company, San Francisco, Calif., a corporation of California Application October 19, 1936, Serial No. 106,321

10 Claims. (Cl. 219—8)

This invention relates generally to machines for forming electrical weld connections or seams between the ends of adjacent steel pipe sections. It is intended particularly for the handling of pipe sections of relatively large size, as for example, sections having a diameter of from 6 to 10 feet, or more.

It is an object of the invention to provide a machine of the above character, which will form a relatively uniform circular weld seam between pipe sections, with proper alignment of the walls, irrespective of deviations of the individual sections from a true cylinder.

Another object of the invention is to provide a machine of the above character which will make possible relatively rapid and substantially continuous circular seaming operations, and with the use of a bed of powdered flux to surround the welding arc.

Another object of the invention is to provide a circular seaming machine capable of handling relatively large pipe sections with a minimum amount of labor, whereby the cost of joining large pipe sections by electrical welding can be reduced to a minimum.

Other objects of the invention will appear from the following description in which the preferred embodiment of the invention has been set forth in detail, in conjunction with the accompanying drawings.

Referring to the drawings:

Fig. 1 is a side elevational view, illustrating a machine incorporating the present invention.

Fig. 2 is an end view of the same machine illustrated in Fig. 1.

Fig. 3 is a view looking towards the opposite end of the machine illustrated in Fig. 2, and showing only those parts below the axis of rotation of the pipe sections.

Figs. 4, 5, 6 and 7 are details, illustrating the construction of articulated stiffening rings, which are applied within the pipe sections, prior to a welding operation.

Fig. 8 is a side elevational view, partly in cross section, illustrating particularly the welding head and parts associated with the same, and a backing-up bar and its associated assembly.

Fig. 9 is a cross sectional view taken along the line 9—9 of Fig. 8.

Figs. 10 and 11 are enlarged cross-sectional details showing mounting means for the backing up bar.

Referring first to Figs. 1 and 2, the machine consists in general of a pair of track rails 10, which carry the wheeled gantry 11. The steel pipe sections 12 and 13 are carried for rotation about a horizontal axis, within this gantry. A trussed frame 14 is adapted to extend longitudinally within the pipe sections, and this frame is shown provided with a convenient walkway 14a, and serves to support a backing-up bar assembly.

The gantry 11 can vary in size and structural detail, in accordance with various requirements. The vertical side portions 15 and 16 carry flanged wheels 17, which engage the track rails 10. The horizontal portion 18 of the gantry is shown as a trussed frame and may form a working platform.

The automatic welding head 19 is carried by the gantry 11, in such a manner that it can be adjusted in a direction laterally across the upper side of the pipe sections. Thus as illustrated more clearly in Figs. 2 and 8, the gantry includes a pair of I-beams or like structural elements 21, which extend horizontally over the pipe sections, immediately below the trussed frame 18. The upper edges of these I-beams carry the track bars 22 and 23 (Fig. 8). Rollers 26 serve to engage the track bars 22 and 23, and in turn form a part of the carriage 27. Suitable clamping means is provided whereby the position of the carriage 27 with respect to the I-beams 21, can be fixed as desired. For example rods 28 are secured to the underside of the carriage and extend through clamp bars 29, the lower end of the rods being threaded for engagement by nuts 31.

By loosening and tightening nuts 31 it is evident that the carriage can be adjusted to and fixed in any desired position.

Secured to one side of the carriage 27, there is a vertical guide 32, serving as a slidable mounting for the slide member 33. Slide 33 in turn carries the automatic welding head 19, through the attaching bracket 34. The details of the welding head 19 need not be described, because such devices are known in the art. It is sufficient to state that they are provided with electromotive means whereby a welding rod or wire is automatically fed towards the seam being welded.

In order to maintain a fixed positioning between the body of the head 19 and the pipe sections being welded, means is provided to engage one of the pipe sections near the same being welded, whereby the body of the welding head is automatically raised or lowered in accordance with non-circular contour characteristics of the pipe. Thus a rigid arm 36 is shown attached to the slide 33, and the lower end of this arm carries a roller 37, adapted to engage the upper side of the pipe, at a region adjacent the seam being welded. Assuming that the slide 33 is free to move upwardly and downwardly with respect to the carriage 27, it is evident that the vertical positioning of the welding head 19, will be determined by the surface contacted by roller 37. In order to facilitate raising of both the welding head and the roller 37, with respect to the pipe sections, manually operated means are provided to lift the slide 33. This means can take the form of a threaded rod, operated by turning handle 38, and which engages a nut 39 carried by slide 33.

The means utilized for rotating the pipe sections, during a welding operation, consists of two sets of rollers or wheels 41 and 42, which are carried by the spaced shafts 43. Certain of these rollers can be driven by suitable means such as an electric motor, through a speed reducing drive 44. It will be noted from Fig. 2, that as aligned pipe sections rest upon the rollers 41 and 42, their axis is located centrally with respect to the gantry 11, and the upper side of the pipe sections underlie the automatic welding head 19.

In electrical welding operations such as are carried out by my machine, it is essential to have a chill or backing-up bar, in engagement with the work below the welding zone. This backing-up bar is in the form of a relatively heavy shoe 46, formed of suitable metal such as bronze or hard copper, and having passages 101 for circulation of cooling liquid. The shoe is reinforced by a mounting block 102, in which it is clamped. It is supported by parts which in turn are carried by the elongated trussed frame 14. Thus the structural end portions 47 and 48 of the frame 14, carry a pair of spaced I-beams 49 or like structural elements (Figs. 1, 8 and 9). These I-beams form a track which is engaged by the flanged rollers 51, of a carriage 52. The carriage includes the spaced side plates 53, which are connected together at their ends, and which carry the yoke 54. Pin 56 forms a fulcrum connection between the yoke 54 and the beam 57. A vertically extending plate 58 has its upper end provided with a stud 59, which extends into the recess 60 in shoe 46, to form a pivotal connection. The lower end of plate 58 is provided with a pivotal connection 61, to one end of the beam 57. Plate 58 also passes through a guide 62, formed on the carriage 52, whereby only vertical movements are permitted. The other end of beam 57 carries an adjustable weight 63, whereby a predetermined amount of thrust is applied through the beam 57 and plate 58, to the backing-up bar or shoe 46. A particular feature of this arrangement is that the axis of the pivotal connection to shoe 46, is near the forward end of this shoe, instead of being midway between the ends. As will be presently explained, such an arrangement has been found to give superior results.

Suitable means is also provided for locking carriage 52 in a fixed position with respect to the I-beams 49. For example as shown in Fig. 9, a rod 64 has its upper end secured to yoke 54, and has its lower end passing through the clamp bar 66. The lower threaded end of rod 64 is engaged by the clamping nut 67.

To facilitate the positioning of the frame 14, within pipe sections being welded, and to permit removal of this frame and its associated parts at the end of a welding operation, the frame is supported by wheels or rollers, whereby it can be moved longitudinally of the main track rails 10. Thus one end of this frame carries flanged wheels 72, which engage additional track rails 71. The right hand end of frame 14, as viewed in Fig. 1, is provided with an arrangement of wheels or rollers, which can be more clearly understood by reference to Fig. 2. Thus one set of oppositely inclined rollers 73 are provided, which are adapted to engage the inner surfaces of the pipe sections. Likewise a pair of rollers 74 are provided which are adapted to engage a pair of short track sections 76, located immediately beyond the adjacent end of the pipe (Fig. 1). Thus when the frame 14 is moved to the left as viewed in Fig. 1, inclined rollers 73 engage the inner walls of the pipe and thus serve to support one end of the frame 14, until the frame is completely removed. Track sections similar to sections 76, can also be provided near the left hand end of the pipe as viewed in Fig. 1, to engage the rollers 74, when the frame has been completely removed.

The type of welding which I prefer to employ with my machine makes use of a powdered flux which is applied over the junction between the pipe sections, to form a bed of flux into which the welding rod or wire is inserted. To enable continuous application of the flux powder as the welding operation proceeds, a suitable hopper 79 is provided as shown in Fig. 2. This hopper can be carried by the upper frame 18 of the gantry, and is provided with a delivery pipe 81, through which the flux powder is delivered at a controlled rate. In order to confine the flux powder and thereby form a bed of substantial depth over the welding zone, a trough-like structure 82 is provided (Figs. 2, 8 and 9). This structure consists of spaced inclined side walls 83, extending on opposite sides of the welding wire 84. The lower edges 86 of these side walls, are contoured in accordance with the external curvature of the pipe being welded. One end of the trough formed by these side walls is open, while the other end is closed by the wall 87. By reference to Fig. 9, it will be evident that pipe 81 delivers the powdered flux into the trough-like structure 82 at a point near the end wall 87, and in advance of the welding head, since as indicated in Fig. 9, rotation of the pipe being welded serves to carry a layer of the flux past the welding zone. The entire trough structure 82 can be secured to an arm 88, which in turn is provided with a pivotal connection 89 to the gantry. Therefore the lower edge 86 of the structure 82, rides in engagement with the upper surface of the pipe sections.

The flux powder used in such operations is generally recovered for re-use. For this purpose I have indicated a receiving hopper 91 (Fig. 2) adjacent one side of the pipe, and which delivers the unused flux powder to the receptacle 92.

The large size steel pipe usually handled in my machine requires some stiffening to facilitate a proper welding operation. For this purpose a plurality of stiffening rings 94 are shown applied within the pipe sections at longitudinally spaced intervals. These stiffening rings can vary in detailed construction, although they are preferably formed of a plurality of sections to facilitate their application and removal. Thus as shown in Figs. 2 and 3, in conjunction with detailed Figs. 4 to 7 inclusive, each ring is formed of curved I-beam segments. Thus one I-beam segment 94a has its ends pivotally secured to adjacent ends of the segments 94b and 94c. These segments in turn connect to the segments 94d through the turn-buckles 96, whereby the composite ring so formed can be expanded in tight engagement with the inner peripheral surface of the pipe sections, or readily collapsed by loosening the turn-buckles 96.

In conjunction with the means employed to rotate the pipe sections, some provision should be made for preventing longitudinal creepage of the pipe. For example rollers 104 can be provided to engage the end edges of the pipe. The mounting of these rollers should be such that they can be readily shifted to out of the way positions, or moved to different positions to accommodate pipes of various sizes.

Operation of my machine can now be reviewed as follows:—Two pipe sections to be welded together along a circular seam, are stiffened by application of the rings 94, and then the ends to be joined are tacked together by welding, to form a temporary connection. These sections are then placed within the gantry 11, on the rollers 41 and 42. The automatic welding head 19 is then adjusted to a position substantially overlying the junction between the pipe sections. The elongated frame 14 is also positioned within the pipe sections, substantially as shown in Fig. 1, and the backing bar 46 adjusted to a position immediately underlying the welding head, as shown in Fig. 8. It will be noted in this figure that the edges of the pipe sections to be joined are bevelled to form a V-notch to receive the weld metal. Suitable electrical bus connections are then established to the welding head, and to the pipe sections. Flow of flux is established from the hopper 79, and the pipe sections are started in rotation. When a suitable bed of flux has been provided about the welding wire 84, the electrical welding circuit is also established to commence the welding operation. The speed of rotation of the pipe sections and other factors controlling the application of weld metal, are correlated to provide a proper weld seam. The welding can be continued until completed, althought if necessary it can be interrupted from time to time to re-establish proper bus connections to the pipe sections. After making a proper weld seam, the gantry can be moved away from the pipe sections, the inner frame 14 removed from the interior of the pipe, and the pipe sections then handled by a suitable hoist.

The backing-up bar 46, as shown in Fig. 11, maintains at all times positive contact with the inner side of the pipe, in a region immediately below the point of the weld. The axis of stud 59 is aligned with welding rod or wire. Frequently beads of slag work their way out between the left hand end of the shoe, as viewed in Fig. 11, and the inner side of the pipe. If stud 59 were located midway between the ends of the shoe, then such beads of slag would tend to cause a separation of the shoe from the pipe, immediately below the weld. With the present arrangement the beads of slag may work out, to the extent of forcing away one end of the shoe as shown by dotted lines, without destroying the desired close fit against the pipe.

The machine can be readily adjusted to take pipes of various sizes. In altering the machine to take a radically different diameter pipe, it may be necessary to change the distance between the centers of shafts 43. Also the side uprights of the gantry can be shortened or extended, and the trussed frame 14 can be altered with respect to its height.

I claim:

1. In a machine of the character described for forming an electrical weld connection between the ends of steel pipe sections, means engaging two adjacent and alined pipe sections for rotating the same about a horizontal axis, a welding head overlying the sections adjacent the circular junction between the same, said welding head serving to automatically supply a welding rod or wire to said junction, a backing up bar on the inner side of the pipe sections and slidably engaging the region of said junction immediately below said welding rod or wire, and means for supporting said backing bar, said last means including a wheeled carriage whereby said structure together with the backing bar can be moved in a direction longitudinally of the pipe sections.

2. In a machine of the character described for forming a circular electrical weld connection between the ends of steel pipe sections, means engaging two adjacent pipe sections for rotating the same about a horizontal axis, an automatic welding head located exteriorly of the pipe sections and adapted to operate upon the junction between the same, a frame extending within said pipe sections, means serving to movably support said frame whereby said frame can be removed from the interior of said pipe sections by movement of the same in a longitudinal direction, tracking means carried by said frame, a wheeled carriage engaging said tracking means, and a backing-up bar assembly mounted upon said carriage.

3. In a machine of the character described for forming a circular electrical weld connection between the ends of steel pipe sections, means engaging two adjacent pipe sections for rotating the same about a horizontal axis, an automatic welding head located exteriorly of the pipe sections and adapted to operate upon the junction between the same, a frame extending longitudinally through said pipe sections, means serving to movably support said frame work whereby said frame can be removed from the interior of said pipe sections by movement of the same in a longitudinal direction, tracking means carried by said frame, and extending parallel to said axis, a carriage tracked upon said tracking means, and a backing-up bar assembly mounted upon said carriage, said backing-up bar assembly including a shoe adapted to slidably engage said pipe sections in the region of said junction, and means for urging said backing-up bar against the inner peripheral surface of the pipe sections.

4. In a machine of the character described for forming a circular electrical weld seam between the ends of steel pipe sections, means engaging two adjacent pipe sections for rotating the same about a horizontal axis, an automatic electrical welding head overlying the pipe sections adjacent the circular junction between the same, said welding head serving to feed a welding rod or wire to said junction, an open bottomed trough encompassing the region adjacent said welding rod or wire, the lower side edges of the trough being spaced apart and disposed on opposite sides of the seam in close juxtaposition to the surface of the pipe, and means for continuously supplying a powdered flux material to said trough.

5. In a machine of the character described for forming a circular weld seam between the ends of relatively large steel pipe sections, rollers engaging the outer periphery of two adjacent pipe sections for rotating the same about a horizontal axis, a track extending longitudinally of the pipe sections, a gantry operating upon said track and spanning the pipe sections, a welding head secured to said gantry and adapted to operate upon the junction between the pipe sections, an elongated frame adapted to extend through the interior of the pipe sections, a track formed on said frame and extending parallel to the axis of the pipe sections adjacent the upper sides of the same, and a backing-up bar assembly operating upon said last named track.

6. In an electrical welding machine, a welding head, means for progressing a seam to be welded below the welding head, the seam being between two steel plates, a backing up bar disposed below the zone of the weld, means having a pivotal connection with the backing up bar for causing the same to be pressed against said plates and relatively stationary with respect to the head, said means including a pivotal connection to the bar which is offset from the center of the same.

7. In an electrical welding machine having a backing up bar moving relative to the work and below the welding zone, means pivotally connected to the bar and serving to press the same into tight engagement with the work, that end of the bar faced toward the direction in which the weld is progressing being substantially shorter than that end of the bar extending in the opposite direction.

8. In a machine for forming a circular weld seam between the ends of steel pipe sections, means engaging two adjacent pipe sections for rotating the same about a horizontal axis, an electrical weld head overlying the sections adjacent the circular junction between the same, a backing up bar disposed within the pipe sections and below the welding head, and means pivotally connected to the bar and serving to press the same into tight engagement with the work, that end of the bar faced towards the direction in which the weld is progressing being substantially shorter than that end of the bar extending in the opposite direction.

9. In a machine for forming a circular weld connection between the ends of steel pipe sections, means engaging two adjacent pipe sections for rotating the same about a horizontal axis, an automatic welding head located exteriorly of the pipe sections and adapted to operate upon the junction between the same, a wheeled gantry serving to carry said welding head, tracking means for said gantry extending parallel to the axis of rotation of the pipe sections, a frame extending within said pipe sections, means serving to movably support said frame whereby said frame can be removed from the interior of said pipe sections by movement of the same in a longitudinal direction, tracking means carried by said frame, a wheeled carriage engaging said tracking means, and a backing up bar assembly mounted upon said carriage.

10. In an electric arc welding machine of the character described for forming a peripheral weld seam between two abutting edges of curved steel plates, and automatic electric welding head overlying the plates, said head serving to feed a welding rod or wire to the junction between the plates, an open bottomed trough encompassing the region adjacent the lower end of the welding rod or wire, the lower edges of the trough being spaced apart and disposed on opposite sides of the seam in close juxtaposition to the upper surface of the plates, means for causing the plates to be progressed relative to both the welding head and the trough, and means for continuously supplying a powdered flux to said trough to form a bed of flux into which the lower end of the welding rod or wire extends.

GEORGE D. WILLIAMS.

Certificate of Correction

Patent No. 2,153,785.     April 11, 1939.

GEORGE D. WILLIAMS

It is hereby certified that errors appear in the above numbered patent requiring correction as follows:

In the grant, lines 2 and 13, and in the heading to the printed specification, line 4, name of assignee, for "Western Pipe & Steel Company" read *Western Pipe & Steel Company of California;*
and that the said Letters Patent should be read with these corrections therein that the same may conform to the record of the case in the Patent Office.

Signed and sealed this 18th day of October, A. D. 1949.

[SEAL]

THOMAS F. MURPHY,
*Assistant Commissioner of Patents.*